United States Patent Office 3,642,676
Patented Feb. 15, 1972

3,642,676
PREPARATION OF ARTIFICIAL LATEXES OF OLEFIN POLYMERS
Frank L. Saunders, Midland, and Ronald R. Pelletier, Bay City, Mich., assignors to The Dow Chemical Company, Midland, Mich.
No Drawing. Filed Dec. 23, 1968, Ser. No. 786,441
Int. Cl. C08f 3/04, 47/18
U.S. Cl. 260—23 EM                                        8 Claims

ABSTRACT OF THE DISCLOSURE

Latexes of olefin polymers having improved stability to creaming or sedimentation and to coagulation are prepared by an improved emulsion process wherein (1) a solution of an olefin polymer in a water-insoluble polymer solvent and an aqueous medium are emulsified with the aid of an emulsifier system having a hydrophile-lipophile balance (HLB) of 7, (2) the polymer solvent is stripped from resulting emulsion to form a latex of the polymer and (3) the HLB of the latex is adjusted to 18.

BACKGROUND OF THE INVENTION

This invention relates to processes for producing latexes of synthetic organic polymers, and more particularly, to improved processes for producing stable, concentrated latexes of olefin polymers from organic solutions of the polymer.

The increasing utilization of latexes in the production of various coating compositions for various industries such as the paper industry has generated considerable interest in producing a wide variety of synthetic organic polymers in latex form in order to improve properties of known coatings and to develop new coating compositions.

Usually, latexes of synthetic organic polymers are prepared by one of two methods: (1) emulsion polymerization which is carried out in an aqueous medium and (2) emulsification of organic solutions of polymers prepared in a non-aqueous medium, e.g., by ionic polymerization, followed by the removal of polymer solvent. Since a number of polymers, particularly the olefin polymers, which cannot readily be prepared by emulsion polymerization are of significant interest to the coating industries, it has been necessary for these industries to utilize polymer solution emulsification methods to prepare latexes of such polymers.

Olefin polymers prepared by polymerization in non-aqueous systems are often in the form of organic solutions. To produce latexes of these polymers, dispersion techniques are used in which (1) an organic solution of the polymer is emulsified in water with the aid of an emulsifying agent, (2) the polymer solvent is removed by distillation and (3) the resulting latex is then concentrated by one of several known methods. Problems which often occur when latexes are prepared by these techniques are ones resulting from emulsion instability. There are basically two kinds of emulsion instability: one in which the emulsion separates into two emulsions, called creaming, and another in which the particles separate from the liquid phase, called coagulation.

Since stability of the concentrated latex to creaming or sedimentation and to coagulation are known to depend upon the emulsifier system, the art has heretofore stabilized latexes by several methods which involve changing the type or concentration of emulsifier, altering the mode of dispersing the organic solution of the polymer in water or vice versa, and the like. In some instances these methods have not been entirely satisfactory, especially in reducing creaming rates of latexes of olefin polymers. Therefore it would be highly desirable to provide further improvements in preparing stable latexes of olefin polymers.

SUMMARY OF THE INVENTION

In accordance with the present invention, stable latexes of olefin polymers are prepared by a process, hereinafter described in detail, comprising the steps of (1) emulsifying together (a) a solution of an olefin polymer in a water-soluble polymer solvent and (b) an aqueous phase, the polymer solution and aqueous phase containing amounts of lipophilic and hydrophilic emulsifiers such that the HLB of the combined polymer solution and aqueous phase is about 7, (2) removing the polymer solvent from the resulting emulsion to form an aqueous latex of the polymer and (3) adjusting the HLB of the latex to about 18.

The essence of this invention resides in emulsifying the polymer solution and aqueous phase when the HLB of the combined polymer solution and aqueous phase is lipophilic and then adjusting the HLB of the system to hydrophilic after the polymer solvent is removed. Surprisingly the latexes prepared under these conditions are much more stable (i.e., have lower creaming rates and form smaller amounts of coagulum) than those in which the HLB of the system is maintained at one value throughout the process.

In the exercise of this invention latexes are prepared which have polymer solid contents up to about 50 weight percent. Such latexes have creaming rates of less than 2 milliliters per hour and form less than 1 percent coagulum in the cream layer after centrifuging at 2400 r.p.m. for more than 2 hours.

The latexes prepared by this method are suitable for use in the preparation of foam rubber sponge extenders, paper size, paper shades and drapes, tire cord coating compositions, emulsion paints, laminates for paper, wood, canvas and plywood, binder for cork, wood, fiber and leather buffings, industrial gloves and protective coatings, dipped goods and adhesives.

DESCRIPTION OF THE PREFERRED EMBODIMENTS

The process of this invention requires as starting materials an olefin polymer, a polymer solvent, a lipophilic emulsifier, a hydrophilic emulsifier and an aqueous liquid.

Olefin polymers employed in the practice of this invention are the polymerized ethylenically unsaturated monomers which are soluble in hydrocarbon solvents, particularly those polymerized ethylenically unsaturated monomers which cannot be made by conventional emulsion polymerization. Suitable polymerized ethylenically unsaturated monomers include the polymerized α-olefins, e.g., ethylene, propylene, butene-1, hexene-1, octene-1 and higher α-olefins; the polymerized monovinylidene aromatic compounds, e.g., styrene, α-methylstyrene, ar-methylstyrene, ar-ethylstyrene, α,ar-dimethylstyrene, ar,ar-dimethylstyrene, ar-t-butylstyrene and the like; the polymerized conjugated dienes and trienes, e.g., 1,3-butadiene, isoprene, cyclopentadiene, etc.; halosubstituted olefins, e.g., vinyl chloride and vinylidene chloride; and copolymers of the above-mentioned monomers and copolymers of these monomers with other ethylenically unsaturated monomers, e.g., acrylonitrile, acrylamide, vinyl acetate, ethyl acrylate, methyl methacrylate, and the like. Also included are the block and graft copolymer of the aforementioned polymers and copolymers, e.g., styrene-butadiene graft and block copolymers. Of particular interest are the polymers which cannot be prepared by conventional emulsion polymerization, e.g., ethylene/propylene copolymers, styrene/butadiene block copolymers, stereospecific polybutadiene, polyisoprene and the like. Methods for preparing the above-described olefin polymers are well known to those skilled in the art and are not a part of this invention. For the purposes of illustration a typical non-aqueous ionic-type polymerization is a Ziegler-type reaction wherein the monomer or mixture of monomers are dissolved in an inert organic solvent and polymerized in the presence of catalyst composition comprising a transition metal compound, e.g., titanium tetrachloride and an organometallic compound, e.g., triethyl aluminum. The polymer which is normally produced in slurry form is solubilized by heating the slurry to temperatures from 60° C. to 120° C.

Polymer solvents suitably employed in the practice of this invention are water-insoluble organic liquids including the aliphatic, cyclic aliphatic, and aromatc hydrocarbons such as pentane, hexane, heptane, amylene, octane, nonane, decane, benzene, toluene, xylene, cyclohexane, methyl cyclohexane, and the like and the chlorinated hydrocarbons, such as carbon tetrachloride, chlorobenzene, and dichlorobenzene. Preferred solvents are those which can be removed by azeotropic distillation of the solvent and water such as toluene and benzene. Aromatic hydrocarbons such as toluene and benzene are especially preferred in making solutions of polymers of the monovinylidene aromatics and copolymers of olefins and the polar monomers, e.g., ethylenically unsaturated esters and the like.

Lipophilic emulsifiers suited for use in this method are the non-ionic types and the saturated or unsaturated fatty acids. Fatty acids are preferred because they are readily converted to hydrophilic emulsifiers upon addition of base. Examples of such acids include oleic, palmitic, stearic, lauric, myristic, ricinic and similar acids. Examples of suitable non-ionic emulsifiers include sorbitan trioleate, sorbitan monostreate, polypropylene glycol monolaurate and others having HLB numbers less than 7, which are listed on pages 235–236 of Becher, infra. Generally, operable lipophilic emulsifiers are oil-soluble ones having an HLB of less than 7 as determined by the method described by Becher in "Emulsions, Theory, and Practice," Reinhold Publishing Corporation, N.Y. (1957), pages 189–199.

Operable hydrophilic emulsifiers are the water-soluble anionic types having HLB numbers of at least 18. Examples of suitable anionic emulsifiers include the alkali and ammonium soaps of resin acids and/or fatty acids, e.g., oleic, palmitic, stearic, lauric, myristic, ricinic, and similar acids; soaps of branched carboxylic acids; soaps of alkyl or aryl sulfuric acids, e.g., sodium lauryl sulfate and sodium dodecyl sulfate; soaps of alkyl or aryl sulfonic acids, e.g., sodium dodecyl benzene sulfonate; and soaps of sulfated and sulfonated glycidyl esters of carboxylic acids. Preferred anionic emulsifiers are the alkali and ammonium salts of the fatty acids, with sodium oleate being especially preferred.

Small amounts of other materials may be dispersed in either the polymer solution or the aqueous phase of the emulsion. Materials which may be present in concentrations up to 5 percent by weight based on the polymer include carbon black, clay fillers, plasticizers, antioxidants, thickeners, etc. Other materials which may be dissolved in the polymer solution or the aqueous phase of the emulsion in similar concentrations include electrolytes, buffers, and the like. If such materials are present in larger quantities they may tend to interfere with emulsification and promote emulsion instability.

The process of this invention comprises emulsification of a water-insoluble organic solution of an olefin polymer in an aqueous medium or emulsification the aqueous medium in the organic solution of olefin polymer, said emulsification being carried out when the combined organic solution of olefin polymers and the aqueous medium have an HLB of about 7. The solvent for the olefin polymer is removed from the resulting emulsion by stripping or other conventional means and the HLB of the resulting latex is adjusted to about 18.

The water-insoluble organic solution of the olefin polymer must be in the form of a fluid, stirrable liquid in order to be readily emulsified in the aqueous liquid or vice versa. The fluidity (i.e. viscosity) of the polymer solution is dependent in part on the molecular weight and molecular structure of the polymer, the concentration of polymer in the solution and the like. Usually it is the best practice to lower viscosity of the polymer solution by diluting the polymer solution with additional polymer solvent. In general polymer solutions utilized in the method of this invention contain up to about 25 weight percent polymer solids, with the preferred solutions having from about 5 to about 20 weight percent. In order to minimize the amount of solvent which must be removed, it is preferable to maximize polymer concentrations within the limits set by viscosity requirements.

Maintaining the HLB of the emulsifier system in particular ranges at particular stages of the procedure is the most critical requirement of this novel process. Simply stated, the HLB number of a system represents the extent to which an emulsifier will tend to act as an oil-soluble or as a water-soluble type of emulsifier. A low HLB, e.g., 1–9, tends to indicate an oil-soluble substance, while a high HLB, e.g., 11–20, suggests a water-soluble substance. See Becher, supra, at pages 232–255 for a complete discussion of HLB. The HLB number for a particular system is usually determined empirically by measuring some parameter of the emulsion indicative of emulsifier efficiency while varying the HLB of the emulsifier system. Usually there is a maximum in emulsifier efficiency within a narrow range of HLB values. Becher, supra, at pp. 189–199 teaches how HLB of a particular emulsifier may be calculated. The HLB number of an emulsifier system, i.e., a mixture of emulsifiers in an emulsion, is readily calculated from the concentration in weight percent and the HLB number of each emulsifier in the system. HLB values for many of the suitable emulsifiers are given in Becher, supra, at pp. 235–238.

In the practice of this process the lipophilic emulsifier is dissolved in an oil solution of polymer, usually in amounts such that the concentration of emulsifier or mixture of emulsifiers ranges from about 1.5 to about 15 weight percent based on the polymer, preferably from about 2 to about 5 weight percent. The oil solution is then combined with the aqueous phase and the HLB of the combined phases is adjusted to about 7. Such adjustment can be accomplished by adding hydrophilic emulsifier to raise the HLB to about 7 or in the case where a fatty acid is used as the lipophilic emulsifier by adding a specified amount of base to the combined phases in order to convert part of the lipophilic fatty acid to the hydrophilic soap of the fatty acid. This step of adjusting the HLB to 7 can be avoided if the proper amount of base is present in the aqueous medium prior to combining the organic and aqueous phases.

Emulsification of the polymer solution and the aqueous phase is accomplished by any of several techniques, for example, dispersing the polymer solution in the aqueous phase or vice versa. In another technique, the polymer solution and aqueous phase are brought together by the alternate or continuous addition of the two liquids to one another.

In a preferred embodiment, a solution of polymer and fatty acid in a water-insoluble solvent is dispersed in an aqueous solution of base. In this system the HLB can be adjusted upward from 7 by the addition of strong base thereby converting the lipophilic fatty acid to the hydrophilic salt of the fatty acid. Accordingly, emulsifier concentration can be kept to a minimum.

Dispersion of the polymer solution and the aqueous phase in one another is readily accomplished with a conventional mixing device, e.g., Waring Blendor, colloid mill, high pressure homogenizer and the like, operating at high rates of agitation, e.g., up to 8400 r.p.m., for periods from about 5 to about 30 minutes. Best results are obtained by mixing the liquids at temperatures from about 40° C. to 100° C. for 5 to 10 minutes.

The polymer solvent is normally stripped from the emulsion at elevated temperatures and pressures until no more solvent can be removed, preferably by azeotropic distillation of the solvent and water. Of course, the polymer solvent may be removed under reduced pressure, if foaming is not a problem. After the resulting latex is free of solvent, a portion of water may be evaporated or distilled under reduced pressure if a higher solids latex is desired. Other methods of removing water include creaming and centrifuging. Latexes prepared by this method contain between about 25 and about 40 weight percent polymer solids prior to concentration and up to about 50 percent afterwards. Concentration of the latex is only an optional step and not a part of the process of this invention.

In the final step of this process the HLB of the resulting latex is adjusted to about 18. This adjustment is accomplished by one of two methods: (1) adding a sufficient amount of a hydrophilic emulsifier having an HLB greater than 18 or (2) by converting a sufficient amount of the lipophilic emulsifier to a hydrophilic emulsifier having an HLB of about 18 or more. The latter method is preferred since it requires only one emulsifier as a starting material. In a preferred embodiment, a latex containing a fatty acid is adjusted to 18 by adding an alkali base to the latex to form a soap of the fatty acid.

In the subsequent examples, the latex creaming test was carried out according to the following description: A sample of the resulting latex at 40 percent solids is placed in a 10 cc. graduated centrifuge tube and creaming of the latex is determined by observing the volume of the lower phase as a function of the centrifuging time at 2400 r.p.m. in a laboratory centrifuge. The results of this test indicate the shelf stability of these latexes to creaming. Stability to coagulation is also obtained in the same creaming test by measuring the coagulum formed in the cream layer after a given length of centrifuging time. After diluting the cream layer in water, the coagulated portion can be filtered and weighed to give a relative measure of stability.

The following examples are given to illustrate more clearly the principle and practice of the invention to those skilled in the art and are not for the purpose of limitation. Throughout this specification and claims, all parts and percentages are by weight unless otherwise indicated.

EXAMPLE 1

A 50-gram portion of a saturated amorphous ethylene/propylene copolymer containing about 50 percent propylene and having a Mooney viscosity of 40 and specific gravity of 0.86 and a 2.5-gram portion of oleic acid were dissolved in 500 ml. of toluene. This solution was emulsified with 500 ml. of a 0.0064 N NaOH solution using a Gifford-Wood Eppenbach homomixer. The resulting emulsion having an HLB of 7 was stripped of solvent by distillation and the dilute latex concentrated to 50 percent polymer solids by removal of water under reduced pressure. A 5.7 ml. portion of 1 N NaOH solution was added to the emulsion to increase the HLB to 18 and the latex was diluted with water to 40 percent polymer solids. The latex was tested according to the latex creaming test, hereinbefore described, and the results are shown in Table I.

For the purposes of comparison several latex compositions were prepared by emulsifying several portions of a toluene solution of ethylene/propylene copolymer and oleic acid prepared according to Example 1 with various proportions of 0.0064 N NaOH solution. A different amount of the NaOH solution was used in the emulsion of each portion in order to obtain an emulsion having a different HLB. Each such emulsion was distilled to remove the toluene and to concentrate the resulting latex to 40 percent polymer solids. The resulting latex samples ($C_x$) were subjected to the conditions of the latex creaming test and the results are shown in Table I.

TABLE I

| Example No. | HLB During emulsification | HLB During creaming test | Latex creaming rate, ml./hr. | Percent coagulation centrifuge [1] |
|---|---|---|---|---|
| 1 | 7 | 18 | 1.2 | 0.3 |
| $C_1$* | 2 | 2 | Unstable | |
| $C_2$* | 4 | 4 | 5.8 | 100 |
| $C_3$* | 7 | 7 | 1.6 | 65 |
| $C_4$* | 10 | 10 | 2.6 | 68 |
| $C_5$* | 12 | 12 | 2.3 | 56 |
| $C_6$* | 15 | 15 | 2.8 | 55 |
| $C_7$* | 18 | 18 | 4.4 | 1.2 |

[1] Percent of latex solids coagulated in cream layer after centrifuging 3 hrs. at 2,400 r.p.m.
*Not an example of the invention.

As evidenced by the data set forth in Table I, creaming rate and latex coagulation are reduced substantially by practicing the method of this invention.

EXAMPLES 2–3

A 50-gram portion of polystyrene was dissolved in 500 ml. of toluene along with 2.5 grams of oleic acid. This solution was emulsified with 500 ml. of 0.0064 N NaOH solution using a Gifford-Wood Eppenback homomixer. The resulting emulsion was stripped of solvent and concentrated to a total weight of 106 grams by removal of water under reduced pressure. The resulting latex was then divided into three equal portions of 35.3 grams each. A portion designated Example 2 was adjusted to an HLB of 18 by adding 1.9 ml. of 1 N NaOH. A portion designated Example 3 was adjusted to an HLB of 18 by adding 0.4 gram of sodium dodecyl sulfate ($NaRSO_4$). For purposes of comparison a third portion (C) was left unchanged at HLB of 7. Each of these three portions was diluted to 40 percent polymer solids and centrifuged for three hours at 2400 r.p.m. as hereinbefore described with the exception that final sediment volumes were determined instead of intial creaming rates. The results from such testing of all three portions are shown in Table II.

TABLE II

| Example No. | HLB [1] | Final sediment volume, cc. | Percent coagulation [2] |
|---|---|---|---|
| 2 | [3] 18 | 2.4 | 1.36 |
| 3 | [4] 18 | 1.1 | 0.46 |
| C [5] | 7 | 4.0 | 7.71 |

[1] HLB of emulsions during centrifuging at 2,400 r.p.m.
[2] Percent of coagulated solids in the portion based on the weight of polymer solids in the portion.
[3] Addition of NaOH.
[4] Addition of $NaRSO_4$.
[5] Not an example of this invention.

What is claimed is:

1. A process for preparing latexes of olefin polymers having improved stability to creaming and to coagulation comprising the steps of (1) emulsifying together (a) a solution of an olefin polymer in a water-insoluble polymer solvent and (b) an aqueous phase, the polymer solution and aqueous phase containing amounts of lipophilic and hydrophilic emulsifiers such that the HLB of the resulting emulsion of polymer solution and aqueous phase is about 7, (2) removing the polymer solvent from the resulting emulsion to form an aqueous latex of the polymer and (3) adjusting the HLB of the latex to about 18, said lipophilic emulsifier having an HLB less than 7 and said hydrophilic emulsifier having an HLB greater than 18.

2. The process according to claim 1 wherein the lipophilic emulsifier is a fatty acid.

3. The process according to claim 2 wherein the fatty acid is oleic acid.

4. The process according to claim 2 wherein the hydrophilic emulsifier is a soap of the fatty acid having an HLB greater than 18.

5. The process according to claim 2 wherein the HLB of the latex is adjusted to about 18 by the addition of strong base.

6. The process according to claim 5 wherein the base is an alkali metal hydroxide.

7. The process according to claim 1 wherein the HLB of the latex is adjusted to about 18 by adding a hydrophilic emulsifier.

8. The process according to claim 7 wherein the hydrophilic emulsifier is sodium dodecyl sulfate.

References Cited

UNITED STATES PATENTS

| | | | |
|---|---|---|---|
| 2,313,144 | 3/1943 | Gomm | 260—32 |
| 2,799,662 | 7/1957 | Ernst et al. | 260—29.7 |
| 3,296,172 | 1/1967 | Funck et al. | 260—29.6 |
| 3,347,811 | 10/1967 | Bissot | 260—29.6 |
| 3,434,993 | 3/1969 | Mirabile et al. | 260—29.6 |

FOREIGN PATENTS

| | | | |
|---|---|---|---|
| 1,385,083 | 11/1964 | France | 260—29.7 |

OTHER REFERENCES

Griffin, Society of Cosmetic Chemists Journal, vol. 1, December 1949, pp. 311–321.

Griffin, Ibid., vol. 5, December 1954, pp. 249–256.

Becher, Emulsions, Theory and Practice, 2nd edition, Reinhold, New York (1965), pp. 231–252.

DONALD E. CZAJA, Primary Examiner

H. S. COCKERAM, Assistant Examiner

U.S. Cl. X.R.

260—23 R, 23.7 A, 29.6 PM, 29.6 XA, 29.6 EM, 34.2